(12) United States Patent
Tadanobu et al.

(10) Patent No.: US 7,342,772 B2
(45) Date of Patent: Mar. 11, 2008

(54) SOLID ELECTROLYTIC CAPACITOR (75) Inventors: Kazuo Tadanobu, Kyoto (JP); Hideto Yamaguchi, Kyoto (JP); Kazuyo Nishida, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/415,077

(22) Filed: May 2, 2006

(65) Prior Publication Data
US 2006/0262486 A1 Nov. 23, 2006

(30) Foreign Application Priority Data
May 17, 2005 (JP) ............................. 2005-143759
Aug. 3, 2005 (JP) ............................. 2005-224874

(51) Int. Cl.
*H01G 9/00* (2006.01)
(52) U.S. Cl. ...................... 361/523; 361/516; 361/519; 361/525; 361/528; 361/529; 29/25.01; 29/25.03
(58) Field of Classification Search ........ 361/523–525, 361/516–519, 528–543; 29/25.01, 25.03
See application file for complete search history.

(56) References Cited

U.S. PATENT DOCUMENTS

| | | | | |
|---|---|---|---|---|
| 5,473,503 A | * | 12/1995 | Sakata et al. ............... | 361/525 |
| 5,754,394 A | * | 5/1998 | Evans et al. ................ | 361/516 |
| 6,134,099 A | * | 10/2000 | Igaki et al. ................. | 361/509 |
| 6,191,931 B1 | * | 2/2001 | Paspa et al. ................ | 361/302 |
| 6,563,693 B2 | * | 5/2003 | Nakada et al. .............. | 361/523 |
| 6,909,596 B2 | * | 6/2005 | Shimoyama et al. ........ | 361/523 |
| 6,962,612 B1 | * | 11/2005 | Saito et al. ................. | 29/25.03 |

FOREIGN PATENT DOCUMENTS

JP 03-145115 6/1991

* cited by examiner

*Primary Examiner*—Nguyen T. Ha
(74) *Attorney, Agent, or Firm*—Wenderoth, Lind & Ponack, L.L.P.

(57) ABSTRACT

A solid electrolytic capacitor includes a plurality of laminated capacitor elements; an anode terminal connected to an anode portion where anode exposed portions of the capacitor elements are connected together; and a cathode terminal connected to a cathode portion where cathode layers of the capacitor elements are bonded together. Between lamination planes of the cathode layers of the capacitor elements, a conductive sheet is disposed. The capacitor elements are coated with a packaging resin layer in such a manner that a part of the anode terminal and a part of the cathode terminal are exposed.

12 Claims, 8 Drawing Sheets

SOLID ELECTROLYTIC CAPACITOR

BACKGROUND OF THE INVENTION

1. Field of the Invention

The present invention relates to a solid electrolytic capacitor used in a variety of electronic devices.

2. Background Art

Figure 18:
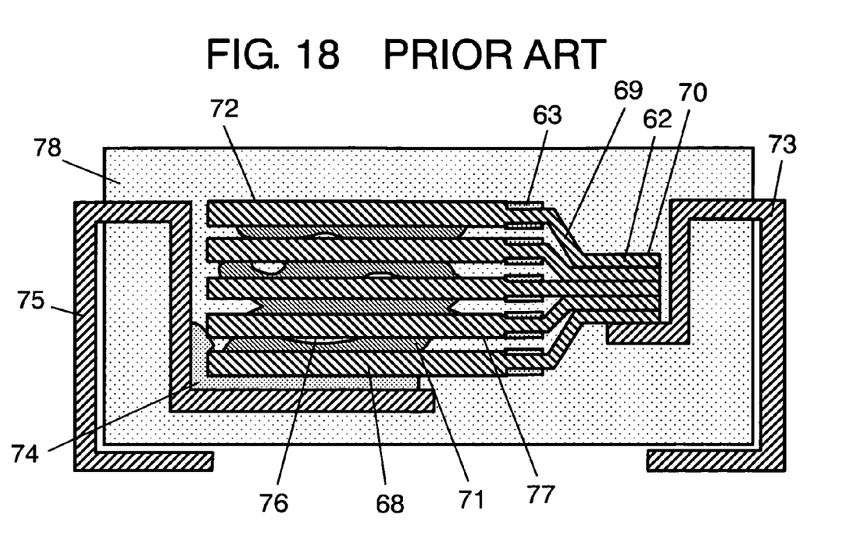
FIG. 18 is a sectional view showing a structure of a conventional solid electrolytic capacitor.

With the recent digitization of electronic devices, solid electrolytic capacitors used in these devices are increasingly demanded to reduce equivalent series resistance (hereinafter, referred to as ESR) in a high frequency range. The following is a description of the structure of a conventional solid electrolytic capacitor with reference to FIGS. 18 and 19. FIG. 18 is a sectional view showing the structure of the conventional solid electrolytic capacitor, and FIG. 19 is a sectional view showing the structure of a capacitor element of the solid electrolytic capacitor.

Figure 19:
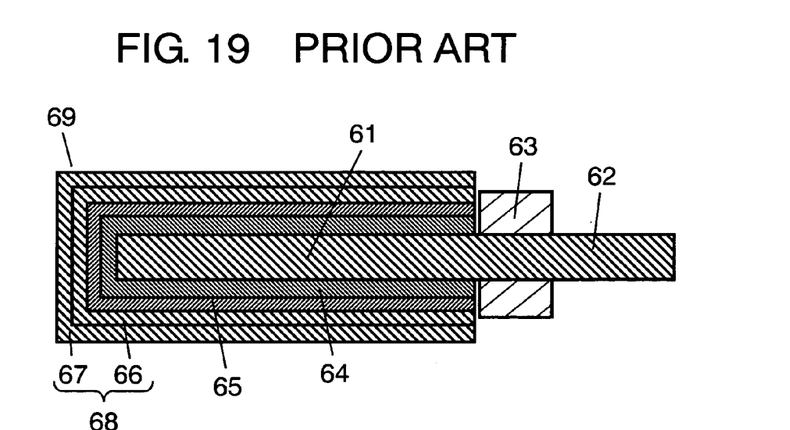
FIG. 19 is a sectional view showing a structure of a capacitor element of the conventional solid electrolytic capacitor.

As shown in FIG. 19, capacitor element 69 includes anode body 61, insulating layer 63, dielectric oxide film 64, solid electrolyte layer 65 and cathode layer 68. Anode body 61, which is planar, is made of a valve metal such as tantalum, aluminum, niobium and titanium. Insulating layer 63 divides anode body 61 into anode exposed portion 62 and the remaining portion. Dielectric oxide film 64 is formed on the surface of the remaining portion of anode body 61, which is divided from anode exposed portion 62. Solid electrolyte layer 65, which is made of a conductive polymer, is formed on the surface of dielectric oxide film 64. Cathode layer 68 is composed of carbon layer 66 formed on the surface of solid electrolyte layer 65, and silver paste layer 67 formed on the surface of carbon layer 66. These layers are sequentially formed to compose capacitor element 69.

As shown in FIG. 18, the solid electrolytic capacitor is composed of a plurality of laminated capacitor elements 69. Anode exposed portions 62 of capacitor elements 69 are welded together to form anode portion 70. Cathode layers 68 of capacitor elements 69 are bonded together via conductive adhesive layers (hereinafter, referred to as adhesive layers) 71 to form cathode portion 72.

Adhesive layer 71 is formed from conductive adhesive paste which is a mixture of silver powder, an organic binder and an organic solvent. More specifically, first, the conductive adhesive paste is applied quantitatively on the lamination planes of cathode layers 68. Then, capacitor elements 69 are laminated together, pressed to spread the conductive adhesive paste between cathode layers 68, and heated to harden the conductive adhesive.

Anode terminal 73 is connected to anode portion 70 by resistance welding, and cathode terminal 75 is connected to cathode portion 72 using conductive paste 74. Packaging resin layer 78 entirely coats laminated capacitor elements 69. This is how the solid electrolytic capacitor is structured. A solid electrolytic capacitor of this type is disclosed in Japanese Patent Unexamined Publication No. H03-145115.

In this conventional solid electrolytic capacitor, however, the heating and hardening of the conductive adhesive for adhesive layers 71 causes the organic solvent to vaporize and generates cavities 76 in the interface between cathode layers 68 and adhesive layers 71. As another problem, if the conductive adhesive is applied insufficiently, when it is spread between cathode layers 68, there may be caused non-formation portions 77 of adhesive layers 71 between cathode layers 68. Thus, it is difficult to spread the conductive adhesive paste between cathode layers 68 to form adhesive layers 71 with high precision. Cavities 76 or non-formation portions 77 cause a reduction in the bonded area between cathode layers 68 and adhesive layers 71. As a result, ESR is increased.

On the other hand, if the conductive adhesive is applied too much, the adhesive may be pushed out from cathode layers 68 or creep up to cause adhesive layers 71 to reach as far as insulating layers 63 or even as far as anode exposed portions 62. This leads to an increase in leakage current and may cause a short circuit. Such situations can be avoided by applying less amount of the conductive adhesive to reduce the bonded area between cathode layers 68 and adhesive layers 71. By doing so, the conductive adhesive is never pushed out to form protrusions on the side faces of cathode layers 68. This can prevent the outside moisture from entering capacitor elements 69 via the conductive adhesive to increase leakage current. However, as mentioned above, applying a reduced amount of the conductive adhesive reverses a reduction in ESR.

In particular, when a plurality of capacitor elements 69 are laminated together in which cathode layers 68 have a plurality of gaps formed therebetween, the conductive adhesive paste is spread differently in each gap. This makes it further difficult to form adhesive layers 71 with high precision. As a result, ESR is increased.

SUMMARY OF THE INVENTION

The present invention provides a solid electrolytic capacitor with more reduced ESR in a high frequency range. The solid electrolytic capacitor of the present invention includes a plurality of capacitor elements, an anode portion, a conductive sheet, a cathode portion, an anode terminal, a cathode terminal and a packaging resin layer. The plurality of capacitor elements are laminated together and each includes an anode body, a dielectric oxide film, a solid electrolyte layer and a cathode layer. The anode body is made of a valve metal having an anode exposed portion. The dielectric oxide film is formed on the surface of the anode body. The solid electrolyte layer is formed on the surface of the dielectric oxide film. The cathode layer is formed on the surface of the solid electrolyte layer. In the anode portion, the anode exposed portions of the plurality of capacitor elements are bonded together. The conductive sheet is disposed between the lamination planes of the cathode layers of the plurality of capacitor elements. In the cathode portion, the cathode layers of the plurality of capacitor elements are bonded together via the conductive sheet. The anode terminal and the cathode terminal are connected to the anode portion and the cathode portion, respectively. The packaging resin layer coats the plurality of capacitor elements in such a manner as to expose a part of the anode terminal and a part of the cathode terminal. In this structure, little deformation of the conductive sheet causes so that the bonded area between the cathode layers can be stably secured, thereby reducing ESR without increasing leakage current. The conductive sheet can minimize the gas generation so as to allow the cathode layers and the conductive sheet to have few cavities on the interface. As a result, ESR is reduced.

DETAILED DESCRIPTION OF THE INVENTION

First Exemplary Embodiment

Figure 1A:
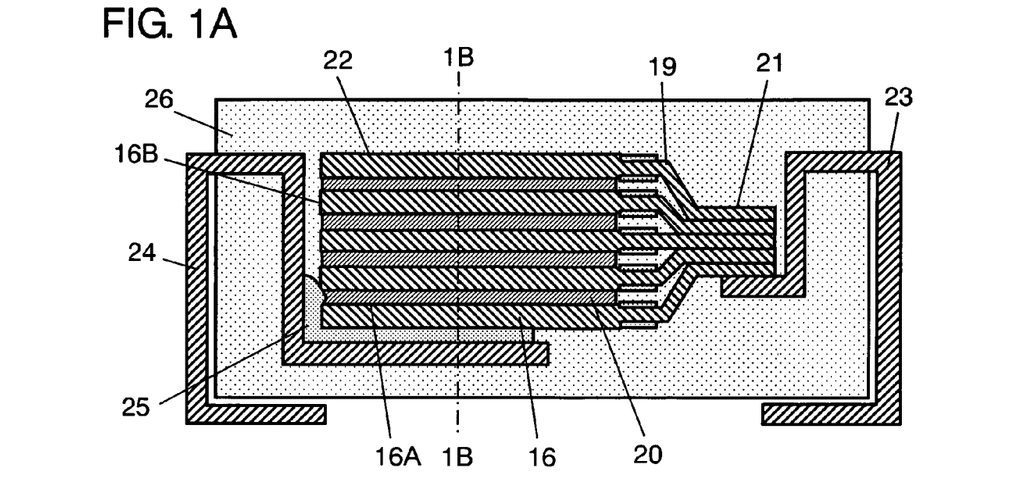
FIG. 1A is a front sectional view showing a structure of a solid electrolytic capacitor of a first exemplary embodiment of the present invention.
Figure 1B:
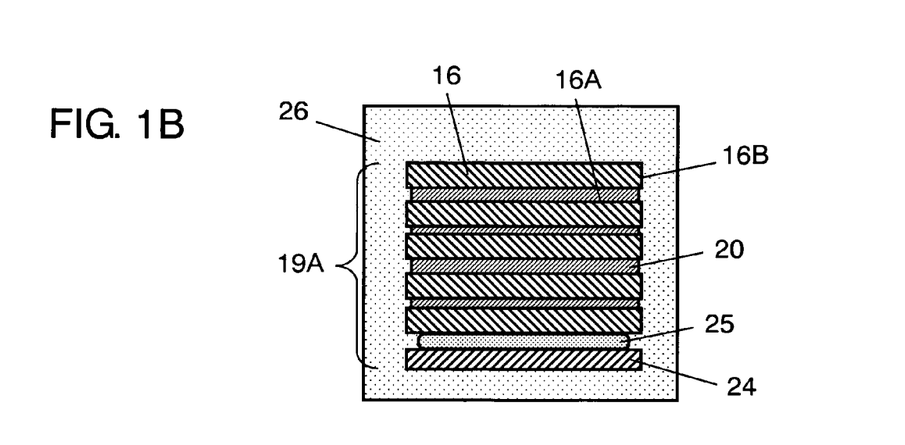
FIG. 1B is a side sectional view of the solid electrolytic capacitor shown in FIG. 1A.
Figure 2:
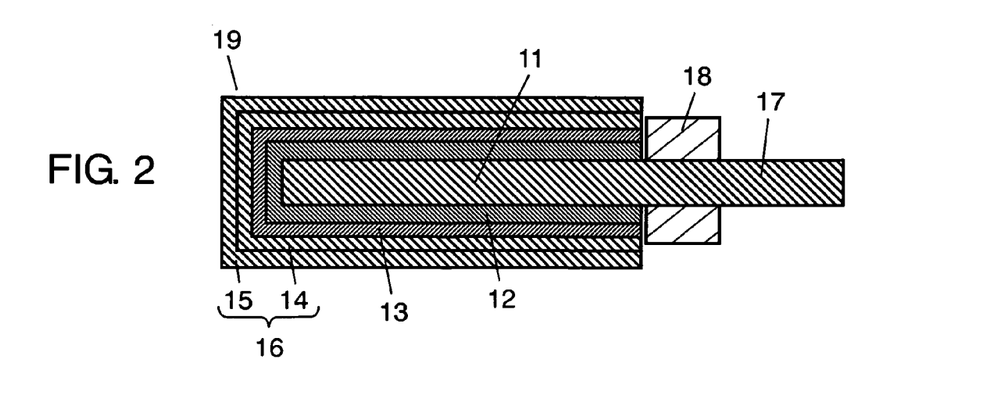
FIG. 2 is a sectional view showing a structure of a capacitor element in the solid electrolytic capacitor shown in FIG. 1A.

FIG. 1A is a front sectional view showing the structure of a solid electrolytic capacitor of a first exemplary embodiment of the present invention. FIG. 1B is a side sectional view of the solid electrolytic capacitor taken along the line 1B-1B of FIG. 1A. FIG. 2 is a sectional view showing the structure of a capacitor element of the solid electrolytic capacitor.

As shown in FIG. 2, capacitor element 19 includes anode body 11, insulating layer 18, dielectric oxide film 12, solid electrolyte layer 13 and cathode layer 16. Anode body 11 is a valve metal foil and includes anode exposed portion 17. Dielectric oxide film 12 is formed by anodization on the surface of the portion of anode body 11 that is divided from anode exposed portion 17 by insulating layer 18. The valve metal used for anode body 11 can be aluminum, tantalum, niobium, titanium or the like. Besides a valve metal foil, anode body 11 can be a porous sintered body made of valve metal powder.

Solid electrolyte layer 13 is made of a conductive polymer formed on the surface of dielectric oxide film 12. Solid electrolyte layer 13 can be made of a conductive polymer such as polypryrrole, polythiophene, and polyaniline, or a manganese oxide such as a manganese dioxide.

Further, cathode layer 16 is formed on the surface of solid electrolyte layer 13. Cathode layer 16 is composed of carbon layer 14, and conductive layer 15 formed on the surface of carbon layer 14 from silver paste. In this manner, dielectric oxide film 12, solid electrolyte layer 13 and cathode layer 16 are formed sequentially on the surface of anode body 11 so as to compose capacitor element 19.

As shown in FIG. 1B, laminated body 19A is formed by laminating a plurality of capacitor elements 19. In FIGS. 1A and 1B, laminated body 19A is composed of five laminated capacitor elements 19. Laminated body 19A has anode portion 21 and cathode portion 22. Anode portion 21 is formed by welding all of anode exposed portions 17 together. Cathode portion 22 is formed by bonding all of cathode layers 16 together via conductive sheets (first conductive sheets) 20.

Anode terminal 23, which is made of a lead frame, is connected to anode portion 21 by resistance welding. Cathode terminal 24, which is also made of a lead frame, is connected to cathode portion 22 using conductive paste layer 25. Packaging resin layer 26 coats laminated body 19A in such a manner that a part of anode terminal 23 and a part of cathode terminal 24 are exposed. This is how the solid electrolytic capacitor is composed.

Conductive sheet 20 is formed as follows. First, a conductive filler of flaky silver (Ag) having an average particle diameter of 5 µm is mixed with an epoxy binder resin and an organic solvent and uniformly dispersed using a dispersing machine such as a three-roll mill and a ball mill. The resultant paste mixture is thinly applied on a substrate which is made of polytetrafluoroethylene or the like and has excellent mold release characteristics. Then, a heating process is applied to vaporize the organic solvent, thereby forming a film composed of the conductive filler and the binder resin. The film is removed from the substrate and processed to have substantially the same shape as lamination plane 16A of cathode layer 16. This results in the formation of conductive sheet 20 having a thickness of 5 µm to 50 µm and a volume resistivity of $0.05 \times 10^{-4}$ to $10.0 \times 10^{-4}$ Ω·cm.

Besides Ag, the conductive filler can be made of copper (Cu), gold, nickel or the like in the form of flakes, spheres, dendritic shapes or other powdery forms, and be also made of conductive polymer powder. These materials can be used either on their own or in combination. Considering the successful uniform dispersion and the thickness of conductive sheet 20, the conductive filler preferably has an average particle diameter of at least 20 µm, and at most half of the thickness of conductive sheet 20.

It is also preferable that the content of the conductive filler is 1.0 to 20.0 times that of the binder resin. When the content of the conductive filler is less than the content of the binder resin, conductive sheet 20 has a too high volume resistivity. When it is over 20.0 times, the binder resin is too little to obtain sufficient adhesive strength. Acceptable resins for the binder resin include phenolic, acrylic, and polyimide resins, for example.

Conductive sheets 20 are heated at 150° C. to 200° C. for 5 to 60 minutes to be hardened so as to bond cathode layers 16 of capacitor elements 19 together. At that time, it is further preferable to apply pressure when bonding cathode layers 16 of capacitor elements 19 via conductive sheets 20. This improves the adhesion between conductive sheets 20 and cathode layers 16 to increase the adhesion strength. It is alternatively possible to bond cathode layers 16 by pressure bonding via conductive sheets 20 without heating conductive sheets 20.

In the structure described above, capacitor elements 19 laminated with conductive sheets 20 disposed therebetween are bonded together. Conductive sheets 20 never creep up like a conductive paste, or hardly deform even in a loaded condition where cathode layers 16 are pressurized. Therefore, conductive sheets 20 are never pushed out by insulating layers 18 or anode exposed portions 17 in such a manner as to form protrusions onto side faces 16B of cathode layers 16. As a result, the bonded area between cathode layers 16 can be stably secured, thereby reducing ESR without increasing leakage current.

Conductive sheet 20 is formed by processing the aforementioned film, which is made by vaporizing the organic solvent contained in the paste mixture, into a desired shape. The vaporization of the organic solvent reduces gas generation when cathode layers 16 are bonded together, so that there are few cavities generated between cathode layers 16 and conductive sheets 20. This also leads to a reduction in ESR.

The bonded area between conductive sheet 20 and lamination plane 16A of cathode layer 16 can be maximized by making conductive sheet 20 have substantially the same shape as lamination plane 16A of cathode layer 16 and by coating conductive sheet 20 on the entire surface of lamination plane 16A. In other words, conductive sheet 20 preferably coats the entire surface of lamination plane 16A of cathode layer 16. This can achieve a solid electrolytic capacitor with further reduced ESR.

Conductive sheet 20 may have a smaller coefficient of elasticity than a metal such as a Cu alloy, a ferrous alloy, and a valve metal. The small coefficient of elasticity of conductive sheet 20 can relieve the stresses of conductive sheets 20 on capacitor elements 19. The stresses are caused when conductive sheets 20 are heat-expanded during mounting on to a circuit board at high temperatures or when the solid electrolytic capacitor is in practical use. This reduces an increase in leakage current due to breakage of conductive layer 15.

Figure 3A:
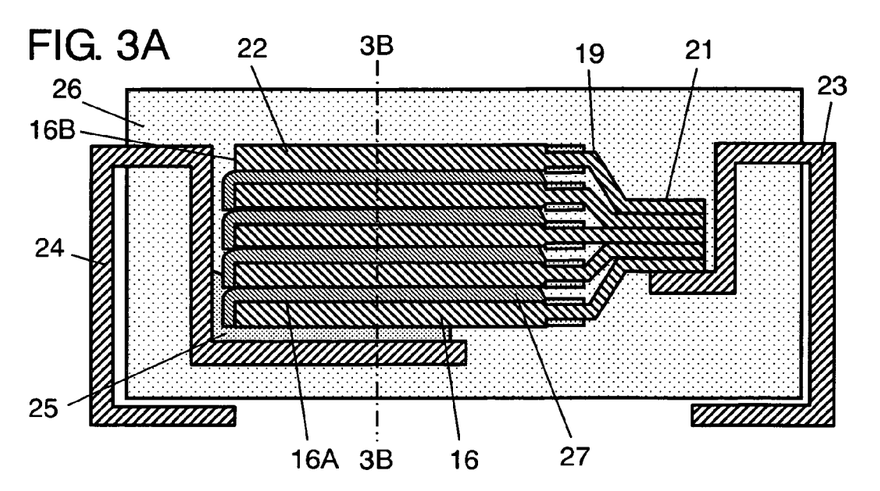
FIG. 3A is a front sectional view showing another structure of the solid electrolytic capacitor of the first exemplary embodiment of the present invention.
Figure 3B:
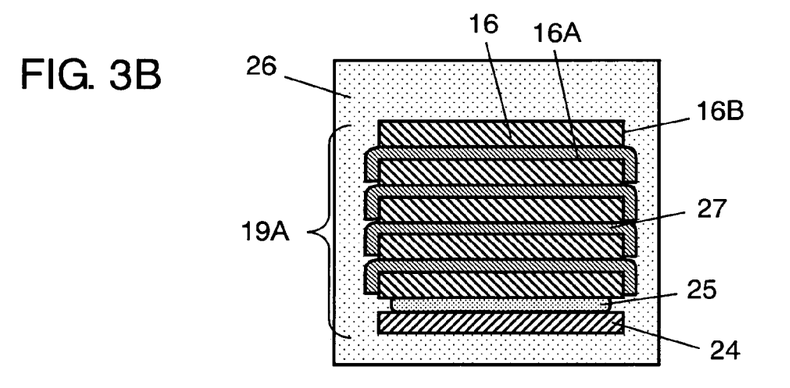
FIG. 3B is a side sectional view of the solid electrolytic capacitor shown in FIG. 3A.
Figure 4:
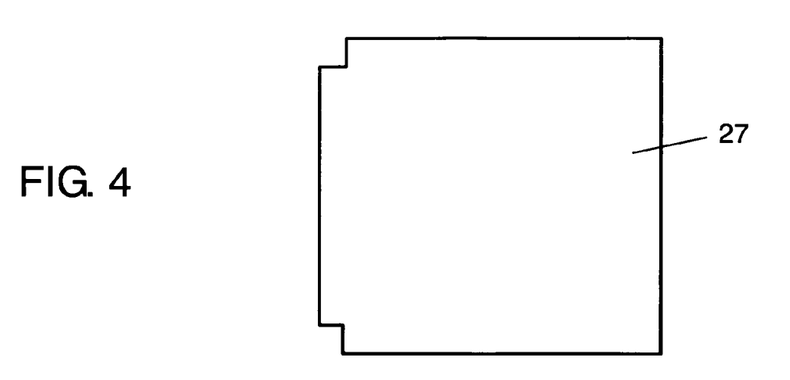
FIG. 4 is a plan view of a conductive sheet of the solid electrolytic capacitor shown in FIG. 3A.

The following is a description of other possible shapes of the conductive sheet. FIGS. 3A and 3B are front and side sectional views showing the structure of another solid electrolytic capacitor of the present embodiment. FIG. 4 is a plan view of a conductive sheet used in the solid electrolytic capacitor.

Conductive sheet 27 is shaped to coat lamination plane 16A and at least one of side faces 16B of cathode layer 16 of capacitor element 19. FIG. 4 shows one example of conductive sheet 27 developed in a plane. In the example, conductive sheet 27 has an area having the same size as lamination plane 16A, and rectangular areas which are protruded from the area having the same size as lamination plane 16A corresponding to three side faces 16B of capacitor element 19.

This structure increases the bonded area between cathode layers 16 and conductive sheets 27, making it possible to achieve a solid electrolytic capacitor with further reduced ESR.

Figure 5:
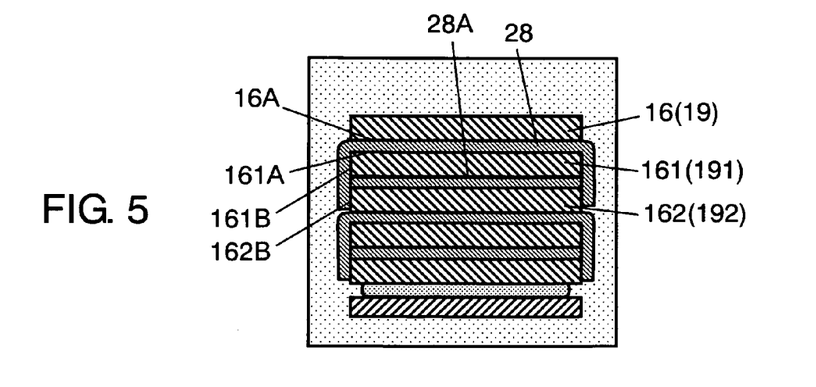
FIG. 5 is a side sectional view showing a structure of a still other solid electrolytic capacitor of the first exemplary embodiment of the present invention.

FIG. 5 is a side sectional view showing the structure of another solid electrolytic capacitor of the present embodiment. First conductive sheet 28 coats lamination plane 16A of cathode layer 16 of first capacitor element 19; lamination plane 161A and at least one of side faces 161B of cathode layer 161 of second capacitor element 191; and at least one of side faces 162B of cathode layer 162 of third capacitor element 192. Between cathode layer 161 and cathode layer 162 is provided second conductive sheet 28A. In this manner, first conductive sheet 28 can coat the side faces of two capacitor elements to obtain the same advantage as the structure shown in FIG. 3A.

Figure 6:
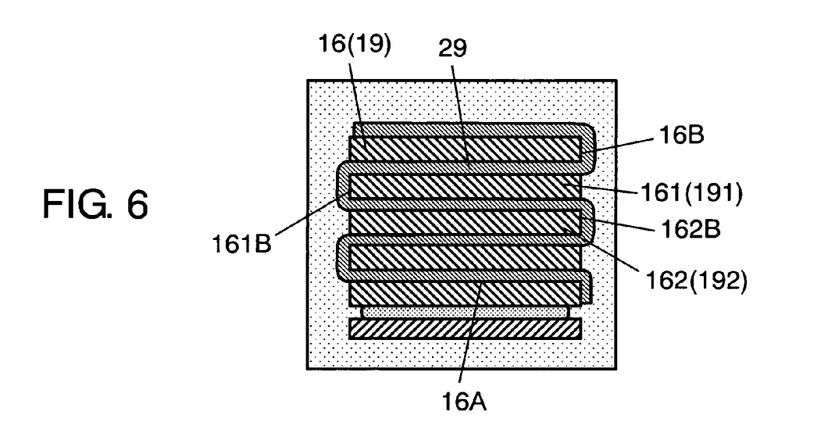
FIG. 6 is a side sectional view showing a structure of a further other solid electrolytic capacitor of the first exemplary embodiment of the present invention.

FIG. 6 is a side sectional view showing the structure of a further other solid electrolytic capacitor of the present embodiment. Conductive sheet 29 is applied between cathode layers 16, 161 and 162, and further on side faces 16B, 161B and 162B of first to third capacitor elements 19, 191 and 192 in a zigzag manner. This structure can also have the same advantage as the structure shown in FIG. 3A.

Figure 7:
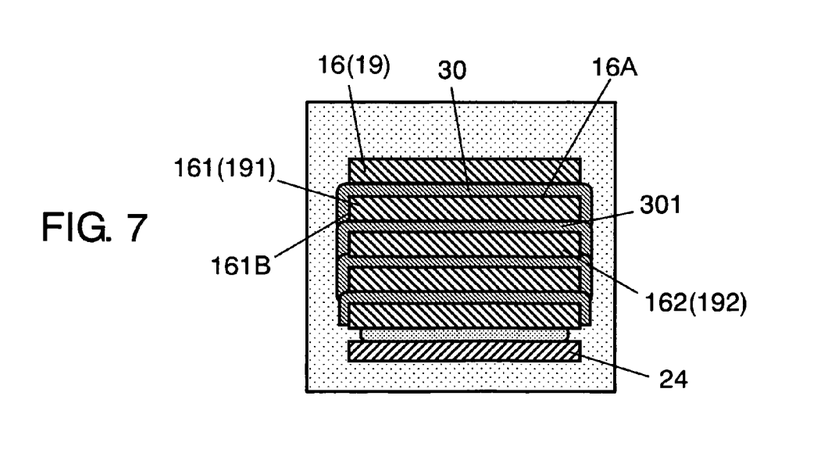
FIG. 7 is a side sectional view showing a structure of a other solid electrolytic capacitor of the first exemplary embodiment of the present invention.

FIG. 7 is a side sectional view showing the structure of another solid electrolytic capacitor of the present embodiment. In this structure, first conductive sheet 30 is disposed between cathode layer 16 of first capacitor element 19 and cathode layer 161 of second capacitor element 191. Second conductive sheet 301 is disposed between cathode layer 161 of second capacitor element 191 and cathode layer 162 of third capacitor element 192. Conductive sheet 30 is in contact with conductive sheet 301 outside of side faces 161B of cathode layer 161, and is hardened with heat for electric connection. This structure can reduce the electric resistance from cathode layer 16 to cathode terminal 24, making it possible to achieve a solid electrolytic capacitor with more reduced ESR than in the structure shown in FIG. 3B. It is alternatively possible to electrically connect two or more conductive sheets via lamination planes 16A. In other words, this structure also has the same advantage as those shown in FIGS. 5 and 6.

Figure 8:
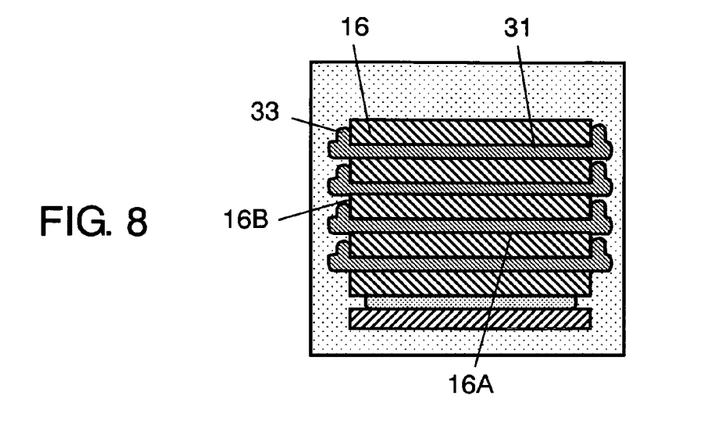
FIG. 8 is a side sectional view showing a structure of another solid electrolytic capacitor of the first exemplary embodiment of the present invention.
Figure 9:
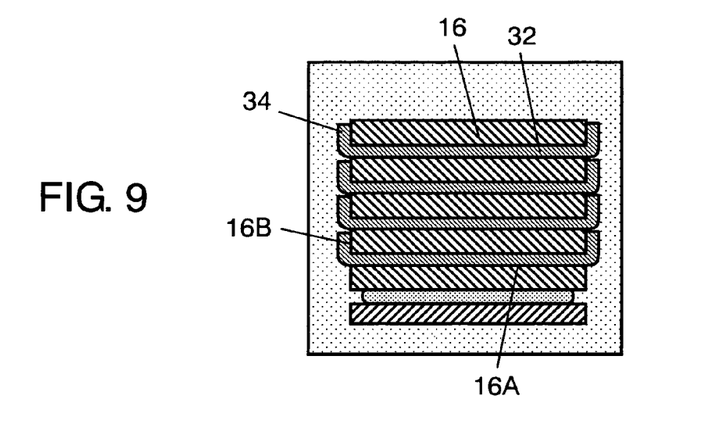
FIG. 9 is a side sectional view showing a structure of a still other solid electrolytic capacitor of the first exemplary embodiment of the present invention.

FIGS. 8 and 9 are side sectional views showing the structures of other solid electrolytic capacitors of the present embodiment. Conductive sheet 31 shown in FIG. 8 is provided with positioning portion 33. Positioning portion 33 is swollen upward so as to be fitted to at least a part of the periphery of at least one of side faces 16B of cathode layer 16 of each capacitor element 19. Positioning portion 33 can be formed either by extruding conductive sheet 31 or by crushing the periphery of conductive sheet 31. Besides, positioning portion 33 can be a swollen-shaped conductive member connected to conductive sheet 31. On the other hand, each conductive sheet 32 shown in FIG. 9 is provided with positioning portion 34. Positioning portion 34 is raised like a wall so as to be fitted to at least a part of the periphery of at least one of side faces 16B of cathode layer 16 by bending the peripheries of conductive sheets 32.

The structures shown in FIGS. 8 and 9 can position cathode layers 16 and conductive sheets 31 and 32 with high precision so as to increase the bonded area. As a result, ESR can be reduced. Note that positioning portions 33 and 34 can be formed on either one or both sides of conductive sheets 31 and 32, respectively.

Figure 10:
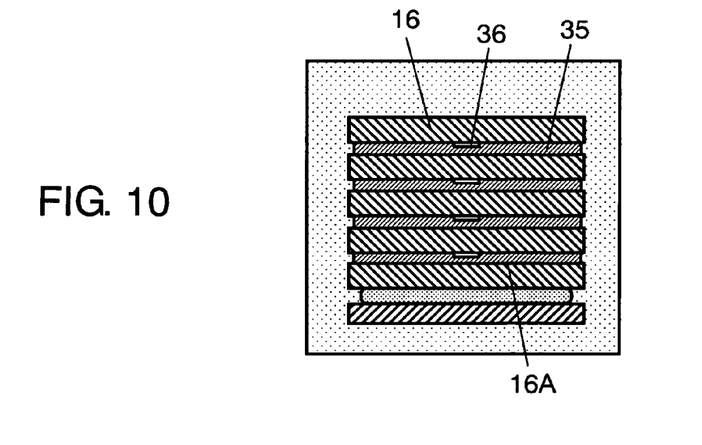
FIG. 10 is a side sectional view showing a structure of a further other solid electrolytic capacitor of the first exemplary embodiment of the present invention.
Figure 11:
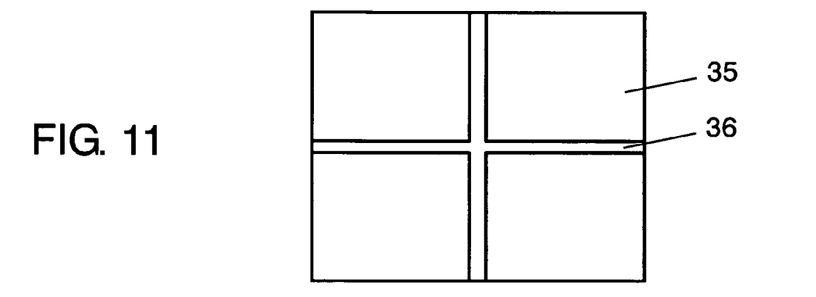
FIG. 11 is a plan view of a conductive sheet of the solid electrolytic capacitor shown in FIG. 10.
Figure 12:
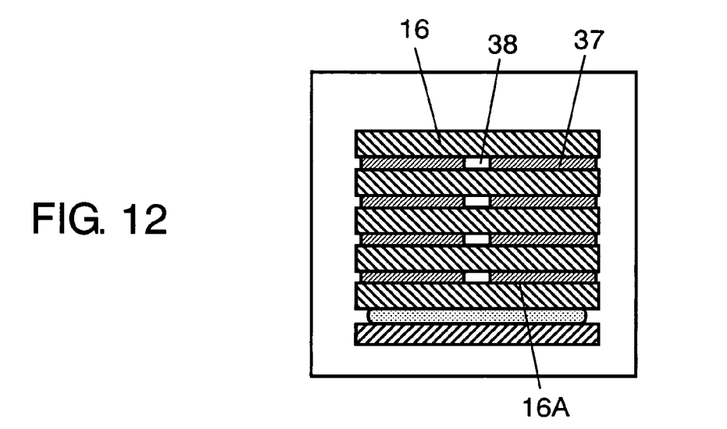
FIG. 12 is a side sectional view showing a structure of a other solid electrolytic capacitor of the first exemplary embodiment of the present invention.
Figure 13:
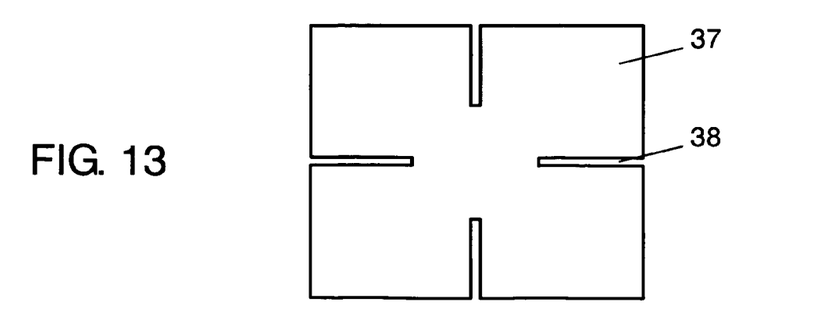
FIG. 13 is a plan view of a conductive sheet of the solid electrolytic capacitor shown in FIG. 12.

FIGS. 10 and 12 are side sectional views showing the structures of other solid electrolytic capacitors of the present embodiment. FIGS. 11 and 13 are plan views of conductive sheets used in the respective solid electrolytic capacitors.

Each conductive sheet 35 shown in FIGS. 10 and 11 is provided with grooved gas venting portion 36 on its side corresponding to lamination plane 16A of cathode layer 16. Gas venting portion 36 is extended from the inside of conductive sheet 35 to an edge thereof. In the example shown in FIG. 11, grooved gas venting portion 36 is in the shape of a cross with two lines which intersect at the center of conductive sheet 35 and extend to reach the edges of conductive sheet 35. Gas venting portion 36 may be formed on either one or both sides of conductive sheet 35.

Each conductive sheet 37 shown in FIGS. 12 and 13, on the other hand, is provided with notched gas venting portion 38 on its side corresponding to lamination plane 16A of cathode layer 16. Gas venting portion 38 is extended in the form of an elongate notch from the inside of conductive sheet 37 to its edge. In the example shown in FIG. 13, gas venting portion 38 is in the form of elongate notches separately extending from different points off the center of conductive sheet 37 to its edges.

When conductive sheets 35 and 37 are films formed by heating the paste mixture and vaporizing the organic solvent in the same manner as conductive sheet 20, trace amounts of the organic solvent sometimes remain in conductive sheets 35 and 37. Conductive sheets 35 and 37 are provided with gas venting portions 36 and 38, respectively. Therefore, the gas of the organic solvent generated when cathode layers 16 are heated to be bonded together is released outside cathode layers 16 through gas venting portions 36 and 38, without forming cavities between cathode layers 16 and conductive sheets 35 and 37. This reduces the cavities between cathode layers 16 and conductive sheets 35 and 37, thereby achieving a solid electrolytic capacitor with further reduced ESR.

The following is a description of other constituent materials of the conductive sheet of the present embodiment. In the description hereinbefore, the conductive sheet is made of a conductive filler and a binder resin, but this is not the only possible constitution. More specifically, the conductive sheet may be made of a tin (Sn)—Ag alloy added with trace amounts of Cu, bismuth (Bi) and indium (In). The conductive sheet can be heated at 160° C. to 230° C. to melt its periphery so as to bond cathode layers 16 together. It is alternatively possible to use Sn by itself, a Sn—Bi alloy, a Sn—In alloy or the like as the metal materials of the conductive sheet and to melt the periphery of the conductive sheet at 110° C. to 260° C. so as to bond cathode layers 16 together.

It is possible to form the conductive sheet as follows using other ingredients. A metal plate is prepared which is made of a metal such as Cu that does not melt at 110° C. to 260° C. Then, at least the surface of the metal plate that is in contact with lamination plane 16A of cathode layer 16 is coated with a metal such as Sn or an Sn alloy which melts at 110° C. to 260° C. This conductive sheet can be heated at 110° C. to 260° C. to melt its periphery so as to bond cathode layers 16 together.

The conductive sheet can be alternatively formed using a conductive polymer such as polypryrrole, polythiophene and polyaniline. In this case, cathode layers 16 can be pressure-connected together via the conductive sheets.

The use of these materials allows the conductive sheet to be formed between cathode layers 16 with little deformation, high precision and no gas emissions. As a result, ESR is reduced.

The following is a description of the advantages of the present embodiment in specific examples. Each sample shows a solid electrolytic capacitor composed of five capacitor elements 19 with cathode layers 16 having a size of 3.3 mm in width, 4.0 mm in length and 0.25 mm in thickness.

As Sample "A", the solid electrolytic capacitor shown in FIGS. 1A and 1B is formed. Capacitor elements 19 are laminated together using conductive sheet 20 having a size of 3.3 mm in width, 4.0 mm in length and 20 μm in thickness and a volume resistivity of $0.1 \times 10^{-4}$ Ω·cm. Then, cathode layers 16 are bonded together to form cathode portion 22. Conductive sheet 20 is made by mixing a conductive filler made of flaky Ag having an average particle diameter of 5 μm and an epoxy binder resin in a weight ratio of 9:1. On the other hand, anode portion 21 is formed by resistance welding anode exposed portions 17. Then, anode terminal 23 is connected to anode portion 21 by resistance welding, and cathode terminal 24 is connected to cathode portion 22 using conductive paste layer 25. Finally, laminated body 19A is coated with packaging resin layer 26 in such a manner that a part of anode terminal 23 and a part of cathode terminal 24 are exposed.

As Sample "B", the solid electrolytic capacitor shown in FIGS. 3A and 3B is formed. Conductive sheet 27 used in this sample is made of the same materials as conductive sheet 20. Each of the rectangular portions of conductive sheet 27 that is formed outside lamination plane 16A and that corresponds to side face 16B of cathode layer 16 has a length of 0.2 mm.

As Sample "C", the solid electrolytic capacitor shown in FIG. 5 is formed. Conductive sheets 28 and 28A used in this example are made of the same materials and thickness as conductive sheet 20. Conductive sheets 28 and 28A have a size of 4.2 mm in width and 4.0 mm in length, and 3.3 mm in width and 4.0 mm in length, respectively.

As Sample "D", the solid electrolytic capacitor shown in FIG. 6 is formed. Conductive sheet 29 used in this example is made of the same materials and thickness as conductive sheet 20, and has a size of 17.9 mm in width and 4.0 mm in length. Conductive sheet 29 coats lamination planes 16A and side faces 16B, 161B and 162B of cathode layers 16, 161 and 162 of capacitor elements 19, 191 and 192 in a zigzag manner.

As Sample "E", the solid electrolytic capacitor shown in FIG. 7 is formed. Conductive sheets 30 and 301 used in this example are made of the same materials as conductive sheet 20. Each of the rectangular portions of conductive sheet 30 that is formed outside lamination plane 16A and that corresponds to side face 161B of cathode layer 161 has a length of 0.3 mm.

As Sample "F", the solid electrolytic capacitor shown in FIG. 8 is formed. Conductive sheet 31 used in this example is made of the same materials as conductive sheet 20. Conductive sheet 31 is extruded in such a manner that positioning portion 33 is fitted to a part of the periphery of at least one of side faces 16B of cathode layer 16 of each capacitor element 19.

As Sample "G", the solid electrolytic capacitor shown in FIG. 9 is formed. Conductive sheet 32 used in this example is made of the same materials as conductive sheet 20. Conductive sheet 32 is provided with positioning portion 34, which is raised like a wall so as to be fitted to a part of the periphery of at least one of side faces 16B of cathode layer 16 of each capacitor element 19 by bending the periphery of conductive sheet 32.

As Sample "H", the solid electrolytic capacitor shown in FIG. 10 is formed. Conductive sheet 35 used in this example is made by applying the paste mixture used for conductive sheet 20 onto a substrate. The substrate has a raised portion corresponding to grooved gas venting portion 36. Gas venting portion 36 has a groove width of 0.1 mm.

As Sample "J", the solid electrolytic capacitor shown in FIG. 12 is formed. Conductive sheet 37 used in this example is made by punching conductive sheet 20 of Sample "A" to form gas venting portion 38. Gas venting portion 38 has a width of 0.1 mm.

As Samples "K", "L" and "M", the conductive sheets having the same size as conductive sheet 20 of Sample "A" are prepared using the following materials respectively. In Sample "K", the conductive sheet is made of a Sn—Ag alloy added with trance amounts of Cu, Bi and In. The conductive sheet can be heated at 160° C. to 230° C. to melt the periphery so as to bond cathode layers 16 together. In Sample "L", the conductive sheet is formed by coating the surface of a Cu plate with Sn. The conductive sheet is heated at 110° C. to 260° C. to melt the periphery so as to bond cathode layers 16 together. In Sample "M", the conductive sheet is made of polypryrrole. In this case, cathode layers 16 are pressure-connected together via the conductive sheets.

For comparison with Samples "A" to "M", another solid electrolytic capacitor is formed as Sample "X". In Sample "X", cathode layers 16 are bonded together via conductive silver paste containing the following ingredients. The conductive silver paste is a mixture of the conductive filler composed of flaky silver (Ag) having an average particle diameter of 5 μm, an epoxy binder resin and diethylene glycol monobutyl ether as an organic solvent. The conductive filler, the binder resin and the organic solvent are in the weight ratio of 8:1:1. The conductive silver paste is applied on the lamination plane 16A of cathode layer 16 of each capacitor element 19, with the amount adjusted so that the conductive silver paste is not pushed out of a side face of cathode layer 16. Then, capacitor elements 19 are laminated together and heated at 150° C. to 200° C. for 5 to 60 minutes to harden the conductive silver paste, thereby bonding cathode layers 16 together.

Fifty of solid electrolytic capacitors with 2V and 220 μF of Samples "A" to "M" and "X" each composed of five capacitor elements are made respectively and measured for ESR characteristics at a frequency of 100 kHz. The results are shown in Table 1 below.

TABLE 1

| sample | Characteristics of cathode portion | ESR mean value (mO) | ESR variations (mO) |
|---|---|---|---|
| A | structure of FIG. 1 | 9.6 | 0.52 |
| B | structure of FIG. 3 | 9.3 | 0.47 |
| C | structure of FIG. 5 | 9.1 | 0.43 |
| D | structure of FIG. 6 | 9.0 | 0.43 |
| E | structure of FIG. 7 | 8.8 | 0.40 |
| F | structure of FIG. 8 | 9.4 | 0.44 |
| G | structure of FIG. 9 | 9.3 | 0.44 |
| H | structure of FIG. 10 | 9.7 | 0.44 |
| J | structure of FIG. 12 | 9.8 | 0.45 |
| K | Sn—Ag alloy sheet | 9.3 | 0.55 |
| L | Sn-coated Cu sheet | 9.0 | 0.48 |
| M | polypryrrole | 10.5 | 0.68 |
| X | conductive silver paste | 12.3 | 1.35 |

As apparent from Table 1, the solid electrolytic capacitors of Samples "A" to "M" are smaller in both ESR values and ESR variations than the solid electrolytic capacitor of Sample "X".

In Sample "A", cathode layers 16 are bonded together by laminating capacitor elements 19 with conductive sheets 20 disposed therebetween. Conductive sheets 20 never creep up, or hardly deform even in a loaded condition where cathode layers 16 are pressurized. Therefore, conductive sheets 20 are never pushed out by insulating layers 18 or anode exposed portions 17 in such a manner as to form protrusions onto side faces 16B of cathode layers 16. As a result, the bonded area between cathode layers 16 can be stably secured, thereby reducing ESR.

ESR values become smaller in the order of Samples "B" to "E". This is because of a reduction in the electric resistance due to the electric connection between the conductive sheets and side faces 16B of cathode layers 16, and the connection between the conductive sheets.

Samples "F" and "G" also have small ESR values because of the same advantage as Sample "B", and small ESR variations because of the advantage of positioning portions 33 and 34.

Samples "H" and "J" have slightly larger ESR values than Sample "A" because the bonded area between the conductive sheets and lamination planes 16A is reduced due to the provision of gas venting portions 36 and 38, respectively. However, these samples have smaller ESR variations because of the advantages of gas venting portions 36 and 38.

Samples "K" and "L" have slightly smaller ESR values because the conductive sheets are made of metals. On the other hand, Sample "M" is a little larger in both ESR value and ESR variation than Sample "A" because the conductive sheets are made of a conductive polymer and are pressure-connected to lamination planes 16A. Even so, Sample "M" is superior to Sample "X".

Second Exemplary Embodiment

Figure 14:
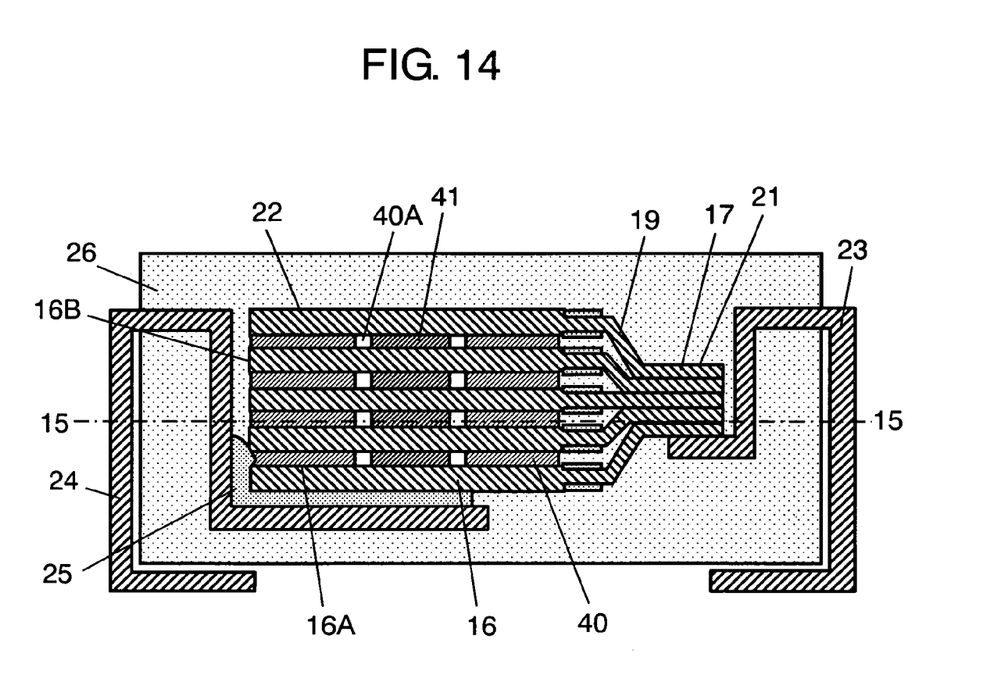
FIG. 14 is a sectional view showing a structure of a solid electrolytic capacitor of a second exemplary embodiment of the present invention.
Figure 15:
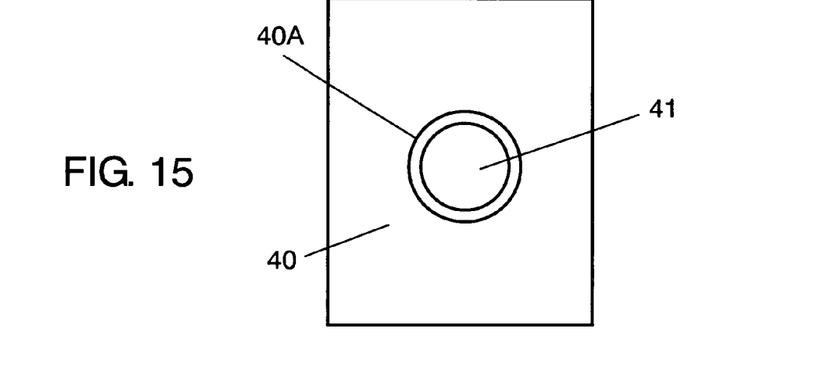
FIG. 15 is a plan view showing an arrangement between a conductive sheet and a conductive paste layer in the solid electrolytic capacitor shown in FIG. 14.

FIG. 14 is a sectional view showing the structure of a solid electrolytic capacitor of a second exemplary embodiment of the present invention. FIG. 15 is a plan view showing an arrangement between a conductive sheet having a penetrating portion and a conductive paste layer in the solid electrolytic capacitor shown in FIG. 14. In FIG. 15, the conductive sheet and the conductive paste are taken along a sectional plane at the line 15-15 of FIG. 14.

The solid electrolytic capacitor of the present embodiment differs from that of the first exemplary embodiment in that the conductive sheets are each provided with a penetrating portion, and the penetrating portion has a conductive paste layer formed therein. The other fundamental structure is identical to that of the first exemplary embodiment, so that it will not be described in detail again.

Conductive sheet 40 is made of the same materials as conductive sheet 20 used in the first exemplary embodiment. Conductive sheet 40 is provided with penetrating portion 40A. The area of penetrating portion 40A on the 15-15 cross section accounts for at least 5% and at most 15% of the area of lamination plane 16A of cathode layer 16. Conductive sheet 40 may have two or more penetrating portions 40A.

At penetrating portion 40A, conductive paste layer 41 is formed therein. In other words, penetrating portion 40A is a space portion to form conductive paste layer 41 therein. Conductive paste layer 41 is formed of conductive adhesive like a paste which is a mixture of a conductive filler composed of flaky Ag having an average particle diameter of 5 μm, an epoxy binder resin and an organic solvent. The following is a brief description of the procedure for forming conductive paste layer 41. First, the aforementioned conductive adhesive is applied on lamination plane 16A of cathode layer 16 using an injector so as to fill 50 to 100% of the area of penetrating portion 40A of conductive sheet 40 on the 15-15 cross section. Then, capacitor elements 19 are laminated and heated at 150° C. to 200° C. for 5 to 60 minutes to harden the conductive adhesive. This is how conductive paste layer 41 is formed. This process further allows each conductive sheet 40 and each conductive paste layer 41 to be connected with lamination plane 16A of cathode layer 16 of each capacitor element 19 simultaneously so as to bond cathode layers 16 of capacitor elements 19. This is how cathode portion 22 is formed.

In the aforementioned procedure for forming cathode portion 22, it is preferable that cathode layers 16 of capacitor elements 19 are bonded together with pressure to improve the adhesion between conductive sheets 40 and cathode layers 16 so as to reduce the interface resistance.

This structure allows lamination planes 16A of cathode layers 16 of capacitor elements 19 to be bonded together via conductive sheets 40 and conductive paste layers 41. It also allows cathode layers 16 of laminated capacitor elements 19 to be bonded together. As a result, conductive sheet 40 can have the same advantage as conductive sheet 20 used in the first exemplary embodiment. Furthermore, conductive paste layers 41 provide sufficient bonding strength to prevent cathode layers 16 from displacement. In addition, the provision of penetrating portions 40A for forming conductive paste layers 41 therein can prevent conductive paste layers 41 from being stuck out of lamination planes 16A of cathode layers 16. As a result, an increase in leakage current is securely prevented.

Figure 16:
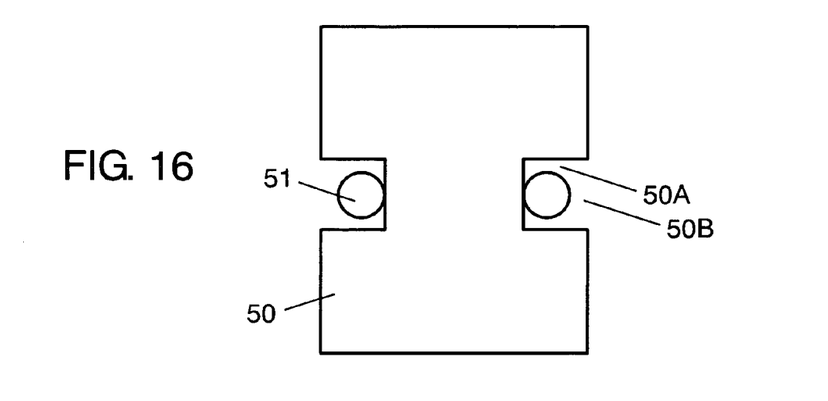
FIG. 16 is a plan view showing another arrangement between the conductive sheet and the conductive paste layer in the solid electrolytic capacitor shown in FIG. 14.
Figure 17:
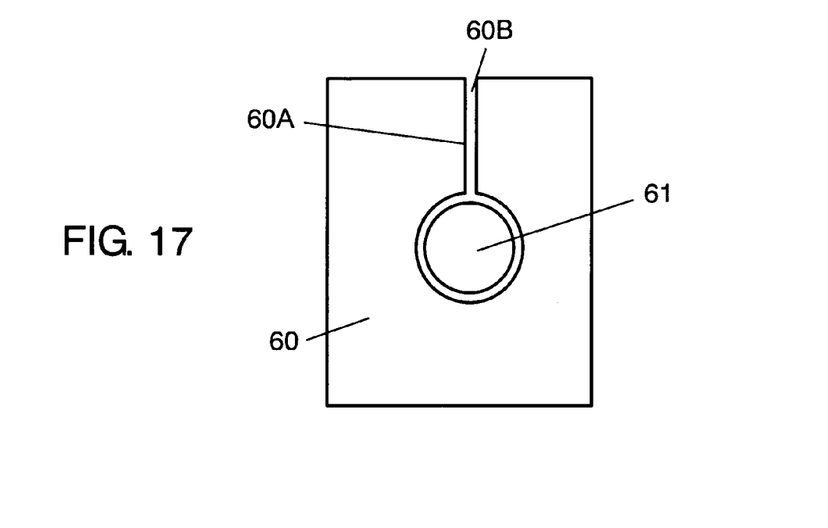
FIG. 17 is a plan view showing a still other arrangement between the conductive sheet and the conductive paste layer in the solid electrolytic capacitor shown in FIG. 14.

The following is a description of other possible shapes and arrangements between the conductive sheet and the conductive paste layer. FIGS. 16 and 17 are plan views showing other arrangements of the conductive sheet and the conductive paste layer in the solid electrolytic capacitor shown in FIG. 14.

Conductive sheet 50 shown in FIG. 16 has notch portions 50A formed along its periphery to form conductive paste layers 51 therein. Conductive sheet 60 shown in FIG. 17 has notch portion 60A which is composed of a hole in the center of conductive sheet 60 and a slit for connecting the hole and the periphery of conductive sheet 60. Conductive paste layer 61 is formed in the hole. In other words, notch portions 50A and 60A are space portions to form conductive paste layers 41 therein. Notch portions 50A and 60A are preferably formed in such a manner that openings 50B and 60B of notch portions 50A and 60A formed on the peripheries of conductive sheets 50 and 60 do not face anode exposed portions 17.

This structure can prevent conductive paste layers 51 and 61 from being stuck out to reach insulating layers 18 or anode exposed portions 17. As a result, ESR can be reduced without an increase in leakage current. Furthermore, the provision of openings 50B and 60B can vent the gas generated when conductive paste layers 51 and 61 are formed using the conductive adhesive. As a result, the gas is prevented from being pushed out by the interface between conductive sheets 50, 60 and cathode layers 16 so as to decrease the bonded area.

Conductive sheets 40, 50 and 60 can be made of metal sheets. It is particularly preferable to use a metal having a high electric conductivity. Acceptable metals include copper metal; a copper alloy such as a Cu-chrome (Cr) alloy or a Cu—Fe alloy having a specific resistance less than three times that of copper, that is, $1.67 \times 10^{-6}$ Ω·cm; and aluminum. The use of a metal sheet having a higher conductivity than conductive paste layers 41, 51 and 61 as the conductive sheets can reduce the electric resistance drawn from cathode layers 16. As a result, ESR is reduced.

The metal sheets preferably each have a thickness of at least 5 μm and at most 50 μm. When the thickness is less than 5 μm, the conductive sheets have too large electric resistance to reduce ESR. When the thickness exceeds 50 μm, on the other hand, it becomes hard to alter the shape of the conductive sheets. This causes a reduction in the bonded area between the conductive sheet and lamination plane 16A of cathode layer 16, making it impossible to reduce ESR.

In the case of using such a conductive sheet made of metal, it can be coated with a metal such as Ag and Sn in order to reduce the contact resistance between the conductive sheet and cathode layer 16. The metal conductive sheet can be alternatively coated with a metal such as Sn, an Sn—Ag alloy, a Sn—Bi alloy and an Sn—In alloy, and the coated metal can be melted to bond cathode layers 16 together. Forming the conductive sheet from a metal sheet having a higher conductivity than conductive paste layer 41 can reduce the electric resistance drawn from cathode layer 16, thereby reducing ESR.

The advantages of the present embodiment will be described as follows using specific examples. Each sample shows a solid electrolytic capacitor composed of five capacitor elements 19 with cathode layers 16 having a size of 3.3 mm in width, 4.0 mm in length and 0.25 mm in thickness.

As Sample "N", the solid electrolytic capacitor shown in FIG. 14 is formed using conductive sheet 40 having a size of 3.3 mm in width, 4.0 mm in length and 20 μm in thickness, and volume resistivity of $0.1 \times 10^{-4}$ Ω·cm. Conductive sheet 40 is formed of a conductive filler made of flaky Ag having an average particle diameter of 5 μm and an epoxy binder resin. Conductive sheet 40 is provided with penetrating portion 40A formed by punching. The area of penetrating portion 40A on the 15-15 cross section accounts for 10% of that of lamination plane 16A of cathode layer 16. A conductive adhesive like a paste is coated in penetrating portion 40A, and five capacitor elements 19 are laminated together. The conductive adhesive is applied on lamination plane 16A of cathode layer 16 so as to fill 80% of the area of penetrating portion 40A on the 15-15 cross section. The conductive adhesive is identical to the conductive silver paste used to bond cathode layers 16 together in Sample "X" in the first exemplary embodiment. The conductive adhesive is heated at 150° C. to 200° C. for 5 to 60 minutes to be hardened so as to form conductive paste layers 41. Hereinafter, the solid electrolytic capacitor of this sample shown in FIG. 14 is formed in the same manner as Sample "A".

As Sample "P", a solid electrolytic capacitor is formed in the same manner as Sample "N" except that conductive sheet 50 shown in FIG. 16 is used in place of conductive sheet 40. Conductive sheet 50 has two notch portions 50A each formed on the periphery thereof by punching in such a manner that openings 50B do not face anode exposed portion 17. The total area of notch portions 50A on the 15-15 cross section accounts for 8% of that of lamination plane 16A of cathode layer 16. Notch portions 50A are coated with paste-like conductive adhesive, and five capacitor elements 19 are laminated together. The conductive adhesive is applied on lamination plane 16A of cathode layer 16 so as to fill 60% of the area of notch portions 50A on the 15-15 cross section. Hereinafter, the solid electrolytic capacitor of this sample is formed in the same manner as Sample "N".

As Sample "Q", a solid electrolytic capacitor is formed in the same manner as Sample "N" except that conductive sheet 60 shown in FIG. 17 is used in place of conductive sheet 40. Conductive sheet 60 has notch portion 60A formed along the periphery thereof by punching in such a manner that opening 60B does not face anode exposed portion 17. The total area of notch portion 60A on the 15-15 cross section accounts for 10% of that of lamination plane 16A of cathode layer 16. The center hole of notch portion 60A is coated with paste-like conductive adhesive, and five capacitor elements 19 are laminated together. The conductive adhesive is applied on lamination plane 16A of cathode layer 16 so as to fill 80% of the area of notch portion 60A on the 15-15 cross section. Hereinafter, the solid electrolytic capacitor of this sample is formed in the same manner as Sample "N".

As Sample "R", a solid electrolytic capacitor is formed in the same manner as Sample "N" except that a Cu sheet is used in place of conductive sheet 40. The Cu sheet has a thickness of 10 μm, the same outer shape and the same size of penetrating portion 40A as conductive sheet 40.

Solid electrolytic capacitors of these samples and Sample "X" as a comparative sample in the first exemplary embodiment are measured for ESR characteristics in the same manner as in the first exemplary embodiment. The results are shown in Table 2.

TABLE 2

| sample | Characteristics of cathode portion | ESR mean value (mO) | ESR Variations (mO) |
|---|---|---|---|
| N | structure of FIG. 15 | 10.1 | 0.53 |
| P | structure of FIG. 16 | 9.9 | 0.50 |
| Q | structure of FIG. 17 | 10.3 | 0.51 |
| R | Cu sheet | 10.2 | 0.56 |
| X | conductive silver paste | 12.3 | 1.35 |

As apparent from Table 2, the solid electrolytic capacitors of Samples "N", "P", "Q" and "R" are smaller in both ESR values and ESR variations than the solid electrolytic capacitor of Sample "X".

In Sample "N", lamination planes 16A of cathode layers 16 of capacitor elements 19 are bonded together via conductive sheets 40 and conductive paste layers 41. This lamination of capacitor elements 19 prevents conductive sheets 40 from creeping up. Conductive sheets 40 hardly deform even in a loaded condition where cathode layers 16 are pressurized. So, the bonded area between cathode layers 16 can be stably secured even when the application area of conductive paste layers 41 is small. As another feature of this sample, conductive sheet 40 and conductive paste layer 41 are never pushed out by insulating layer 18 or anode exposed portion 17 in such a manner as to form protrusions onto side faces 16B of cathode layer 16. As a result, ESR can be reduced without an increase in leakage current.

Furthermore, providing conductive sheet 40 on most of the surfaces of lamination planes 16A can minimize gas generation in bonding cathode layers 16 together. This allows only a few cavities to be formed on the interface between cathode layers 16 and conductive sheet 40. As a result, Sample "N" can be smaller in both ESR value and ESR variation than Sample "X".

Sample "P" uses conductive sheet 50 which is provided along its periphery with notch portions 50A to form conductive paste layers 51 therein. Sample "Q" uses conductive sheet 60 which is provided with notch portion 60A composed of a center hole and a slit to connect the hole and the periphery of conductive sheet 60. The presence of notch portions 50A and 60A allows Samples "P" and "Q" to have as small ESR values as Sample "N". In addition, openings 50B and 60B can vent the gas generated in forming conductive paste layers 51 and 61. As a result, ESR variations are reduced.

Sample "R" uses conductive sheets made of metal. The conductive sheets are in contact with cathode layers 16 for electric connection. This allows Sample "R" to have as low an ESR value as Sample "N". The metal conductive sheets have the effect of slightly increasing the ESR variation because they are in contact. Even so, Sample "R" is far smaller in ESR value and ESR variation than Sample "X".

In the aforementioned description of the present embodiment, the conductive sheets each have either penetrating portion 40A or notch portions 50A, 60A; however, the conductive sheets may have both unless the total area is not too large. It is alternatively possible to provide conductive paste layers without providing penetrating portion 40A or notch portions 50A, 60A. This case uses conductive sheets which are shorter in length than cathode layers 16 in the direction to connect cathode layer 16 of capacitor element 19 and anode exposed portion 17. The conductive sheets are placed close to anode exposed portions 17 so as to form conductive paste layers on the portions of cathode layers 16 which are not coated with the conductive sheets.

As described hereinbefore, the present invention achieves a compact, high-capacity solid electrolytic capacitor with reduced ESR in a high-frequency range, which is being demanded as more and more electronic devices are digitized.

What is claimed is:

1. A solid electrolytic capacitor comprising:
    a plurality of capacitor elements laminated together, each of the capacitor elements comprising:
        an anode body made of a valve metal and having an anode exposed portion;
        a dielectric oxide film formed on a surface of the anode body;
        a solid electrolyte layer formed on a surface of the dielectric oxide film; and
        a cathode layer formed on a surface of the solid electrolyte layer;
    an anode portion where the anode exposed portions of the capacitor elements are bonded together;
    a first conductive sheet having a predetermined shape such that a shape of at least a portion of the first conductive sheet corresponds to a shape of at least one of the plurality of capacitor elements, the first conductive sheet being disposed between lamination planes of the cathode layers of the capacitor elements;
    a cathode portion where the cathode layers of the capacitor elements are bonded together via the first conductive sheet;
    an anode terminal connected to the anode portion;
    a cathode terminal connected to the cathode portion; and
    a packaging resin layer coating the capacitor elements in such a manner that a part of the anode terminal and a part of the cathode terminal are exposed.

2. The solid electrolytic capacitor according to claim 1, wherein the first conductive sheet has a shape that is substantially the same as a shape of the lamination plane of the cathode layer of one of the capacitor elements.

3. The solid electrolytic capacitor according to claim 1, wherein
    the first conductive sheet coats a side face of the cathode layer of one of the capacitor elements.

4. The solid electrolytic capacitor according to claim 1 further comprising a second conductive sheet, wherein:
    the capacitor elements include at least a first capacitor element, a second capacitor element and a third capacitor element;
    the first conductive sheet is disposed between the cathode layer of the first capacitor element and the cathode layer of the second capacitor element; and the second conductive sheet is disposed between the cathode layer of the second capacitor element and the cathode layer of the third capacitor element, and is electrically connected with the first conductive sheet.

5. The solid electrolytic capacitor according to claim 4, wherein the second conductive sheet is composed of conductive filler and binder resin.

6. The solid electrolytic capacitor according to claim 4, wherein the second conductive sheet has a predetermined shape corresponding to each of the plurality of capacitor elements.

7. The solid electrolytic capacitor according to claim 1, wherein
the capacitor elements include at least a first capacitor element, a second capacitor element and a third capacitor element; and
the first conductive sheet is a continuous sheet disposed between the cathode layer of the first capacitor element and the cathode layer of the second capacitor element, and between the cathode layer of the second capacitor element and the cathode layer of the third capacitor element in a zig-zag manner.

8. The solid electrolytic capacitor according to claim 1, wherein
the first conductive sheet is provided with a positioning portion for mounting the cathode layer of one of the capacitor elements.

9. The solid electrolytic capacitor according to claim 1, wherein
the first conductive sheet is provided with a gas venting portion.

10. The solid electrolytic capacitor according to claim 1 further comprising a conductive paste layer disposed between the cathode layers of the capacitor elements, the conductive paste layer bonding the cathode layers together.

11. The solid electrolytic capacitor according to claim 10 wherein
the first conductive sheet is provided with a space portion composed of at least one of a penetrating portion and a notch portion, and
the conductive paste layer is formed in the space portion.

12. The solid electrolytic capacitor according to claim 1, wherein the first conductive sheet is composed of conductive filler and binder resin.

* * * * *